Figure 1:
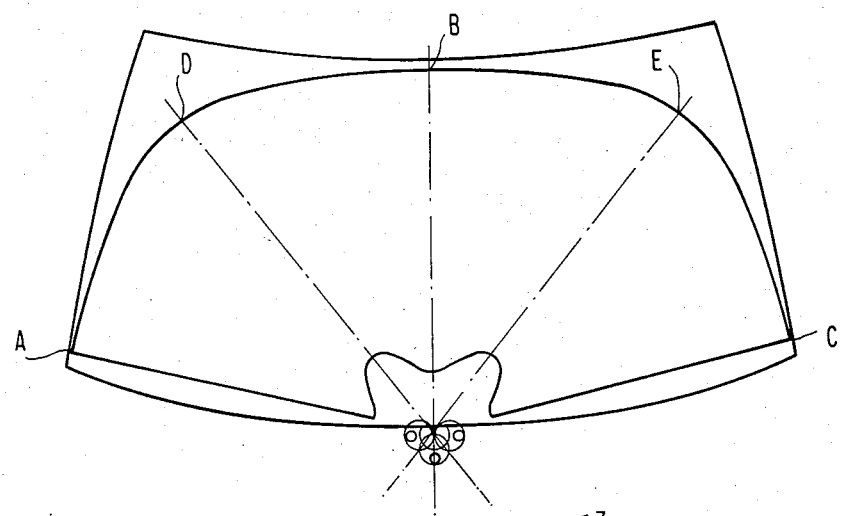

United States Patent [19]

Schmidt et al.

[11] Patent Number: 4,630,327

[45] Date of Patent: Dec. 23, 1986

[54] SINGLE-ARM WINDSHIELD WIPER FOR MOTOR VEHICLES

[75] Inventors: Manfred Schmidt, Sindelfingen; Hans Trube, Herrenberg; Hermann Grimm, Ostelscheim, all of Fed. Rep. of Germany

[73] Assignee: Daimler-Benz Aktiengesellschaft, Stuttgart, Fed. Rep. of Germany

[21] Appl. No.: 758,054

[22] Filed: Jul. 23, 1985

[30] Foreign Application Priority Data

Jul. 28, 1984 [DE] Fed. Rep. of Germany ....... 3427933

[51] Int. Cl.⁴ .............................................. B60S 1/26
[52] U.S. Cl. ............................ 15/250.21; 15/250.23
[58] Field of Search ........... 15/250.13, 250.21, 250.23, 15/250.30, 250.39

[56] References Cited

U.S. PATENT DOCUMENTS

| | | | |
|---|---|---|---|
| 1,270,197 | 6/1918 | Parker | 15/250.21 |
| 2,827,653 | 3/1958 | Dyer et al. | 15/250.21 |
| 3,831,220 | 8/1974 | Gmiener et al. | 15/250.21 |
| 4,447,928 | 5/1984 | Schuch et al. | 15/250.23 |

*Primary Examiner*—Peter Feldman
*Attorney, Agent, or Firm*—Barnes & Thornburg

[57] ABSTRACT

A windshield wiper having at least a single telescope arm, variable in its effective length during the wiper movement. A drive arrangement completely relieves a guide of an extendable part of the wiper arm of laterally directed forces, so that a simple and light embodiment of the drive arrangement and wiper arm is made possible.

4 Claims, 4 Drawing Figures

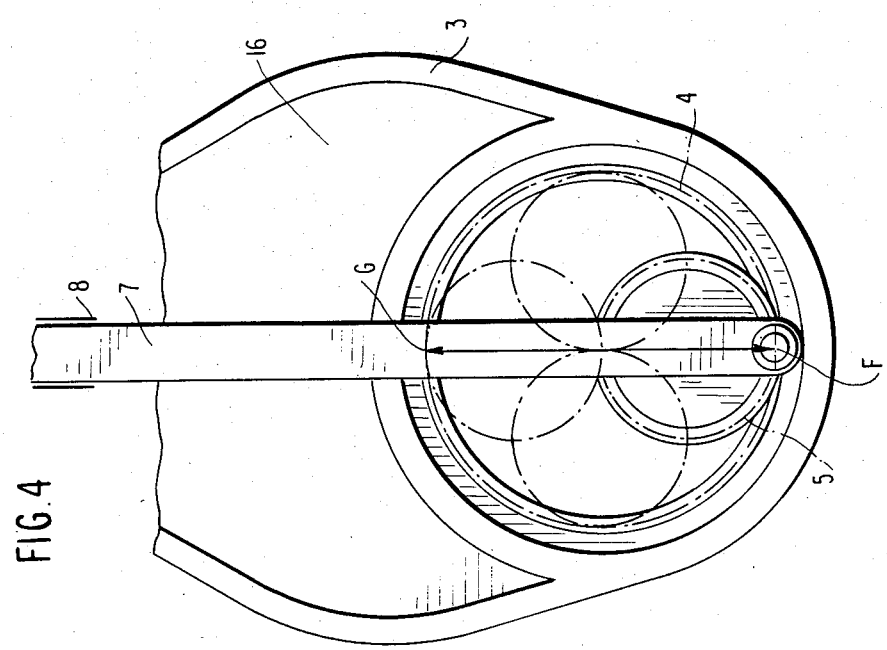
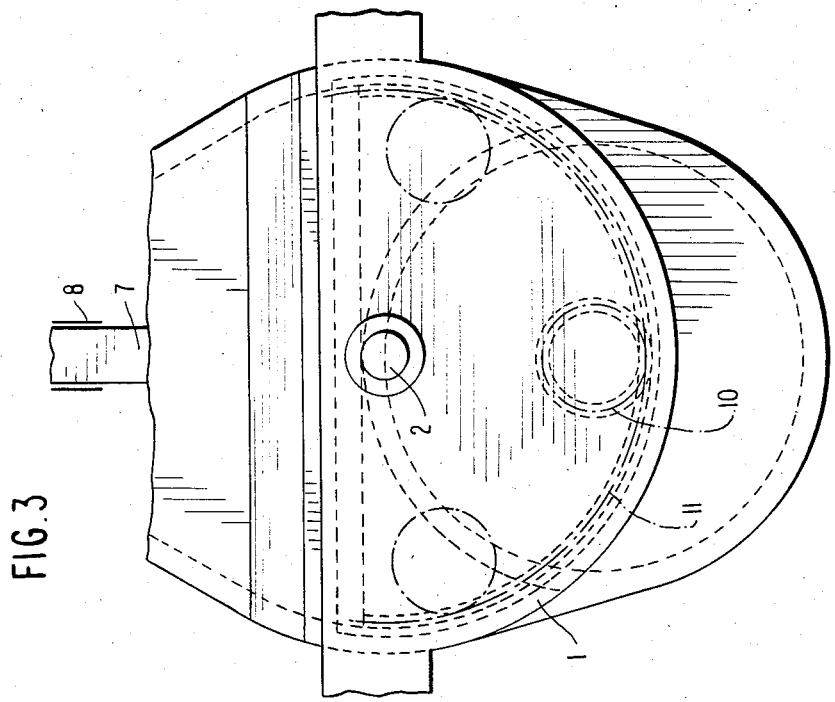

SINGLE-ARM WINDSHIELD WIPER FOR MOTOR VEHICLES

The invention relates to a windshield wiper, especially a single-arm windshield wiper for motor vehicles, the wiper arm of which is designed in the manner of a telescope and is variable in its effective length during the wiper movement, with a lower area of the wiper arm, which lower area acts as a guide for the extendable area of the wiper arm, being designed as a drive housing in which a first gear rim provided with internal toothing is arranged in a non-rotational manner and meshes with a first pinion which acts to transmit the retracting and extending movement to the displaceable part of the wiper arm.

Such a windshield wiper can already be taken as known from the German patent specification No. 3,125,628. However, the disadvantage with the known windshield wiper mechanism is that, because of the use of a crank mechanism, laterally directed stresses are induced in the telescopic mounting of the windshield wiper arm which may cause damage to the arm and which make necessary a relatively expensive configuration of the mounting to avoid damage.

It is therefore an object of the present invention to avoid damage to windshield wipers by providing a solution in which the forces acting only in the axial direction are transmitted onto the retractable and extendable part of the wiper arm.

In a windshield wiper of the generic type defined at the beginning, according to the invention, a first pinion has half the pitch diameter of a first gear rim and is rotatably arranged on a first axis of a crank the second axis of which is rotatably guided through an outer wall of the drive housing and non-rotatably carries a second pinion outside the latter, which pinion meshes with internal toothing of a second gear rim fixed to the vehicle, and in that an extendable part of the wiper arm on the pitch diameter of the first gear rim is articulated to the first pinion.

At the same time, provision is made in an advantageous embodiment of the invention such that the second gear rim is arranged in a housing fixed to the vehicle, which housing is sealed against the swivelable drive housing.

Figure 2:
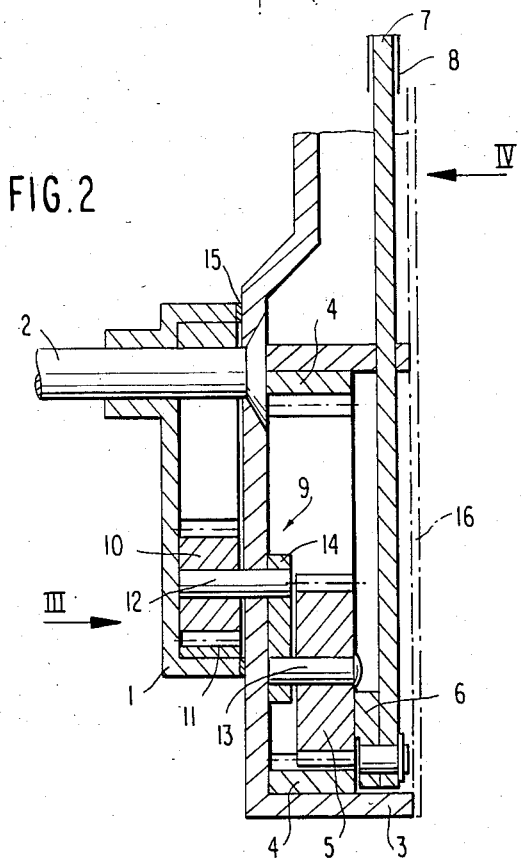

This and other objects, features, and advantages of the present invention will become more apparent from the following description when taken in connection with the accompanying drawings which show, for the purposes of illustration only, one embodiment in accordance with the present invention, and wherein:

FIG. 1 shows a schematic representation of a wiper zone, as is swept by a controlled single-arm windshield wiper mechanism, FIG. 2 shows a section through the control part of a windshield wiper mechanism according to the invention, FIG. 3 shows a representation in the direction of the arrow III in FIG. 2, and FIG. 4 shows a view in the direction of the arrow IV in FIG. 2.

Referring now to the drawings wherein like reference numerals are used to designate like parts and more particularly to FIG. 2, a shaft 2 driven by a wiper motor (not shown) is guided through a housing 1 arranged in a fixed position on the vehicle, which shaft 2 is non-rotatably connected to a swivelable drive housing 3. A first internal-toothed gear rim 4 is firmly arranged in this drive housing 3, with which gear rim 4 meshes a first pinion 5 which has half the pitch diameter of the gear rim 4. Within the pitch diameter of the gear rim 4, the extendable part 7 of the wiper arm is articulated on the pinion 5 via a fixed intermediate piece 6, the guide of which extendable part 7 is indicated at 8.

A second pinion 10 arranged in the housing 1 is connected to the first pinion 5 via a crank 9, which pinion 10 meshes with a second internal-toothed gear rim 11 fixed to the housing. At the same time, the pinion 10 is non-rotatably arranged on an axis 12 of the crank 9, which axis 12 is guided through a wall of the drive housing 3, whereas the first pinion 5 is rotatably mounted on an axis 13 at the other end of the crank arm 14.

The housing 1, which in FIG. 2 is open on the right-hand side, is sealed relative to the swivelable drive housing 3 by a sealing arrangement 15.

The drive housing 3 is closed at the side by a cover 16.

The articulation point of the part 7 of the wiper arm is moved in a straight line from point F towards point G as shown in FIG. 4 by the swivelling of the drive housing 3 via the shaft 2—the positions which pinions 5 and 10 assume during this procedure are indicated by chain-dotted lines in FIGS. 3 and 4. When swivelling takes place from one end position into the other end position, three length minima A, B and C and two length maxima D and E, as shown in FIG. 1, are achieved or described.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. For motor vehicles, a windshield wiper having at least a single telescope arm, the arm being variable in its effective length during wiper movement,
    a drive housing comprising means for guiding the wiper arm during changing of wiper arm effective length,
    a first gear rim means provided with internal toothing, the first gear rim means being fixed to the drive housing,
    a first pinion means meshing with the first gear rim means for retracting and extending a displaceable part of the wiper arm, wherein the first pinion means has half the pitch diameter of the first gear rim means and being rotatable on a first axis of a crank means,
    a shaft of the crank means being rotatably guided on a second axis through an outer wall of the drive housing,
    a second pinion means fixed to said shaft outside the outer wall,
    a second gear rim means fixed to the vehicle, said second gear rim means meshing with said second pinion means, and
    means for articulating the extendable part of the wiper arm to the first pinion means on the pitch diameter of the first gear rim means.

2. A windshield wiper according to claim 1, wherein the second gear rim means is disposed in a second housing fixed to the vehicle, said second housing being sealed with respect to the swivelable drive housing.

3. For motor vehicles, a windshield wiper having at least a single telescope arm, the arm being variable in an axial direction in its effective length and forces acting only in said axial direction are transmitted to the arm, during wiper movement,
- a drive housing comprising means for guiding the wiper arm during changing of wiper arm effective length,
- a first gear rim means provided with internal toothing, the first gear rim means being fixed to the drive housing,
- a first pinion means meshing with the first gear rim means for retracting and extending a displaceable part of the wiper arm, wherein the first pinion means has half the pitch diameter of the first gear rim means and being rotatable on a first axis of a crank means,
- a shaft of the crank means being rotatably guided on a second axis through an outer wall of the drive housing,
- a second pinion means fixed to said shaft outside the outer wall,
- a second gear rim means fixed to the vehicle, said second gear rim means meshing with said second pinion means, and
- means for articulating the extendable part of the wiper arm to the first pinion means on the pitch diameter of the first gear rim means.

4. A windshield wiper according to claim 3, wherein the second gear rim means is disposed in a second housing fixed to the vehicle, said second housing being sealed with respect to the swivelable drive housing.

* * * * *

Notice of Adverse Decision in Interference

In Interference No. 101,835, involving Patent No. 4,630,327, M. Schmidt, H. Trube, H. Grimm, SINGLE-ARM WINDSHIELD WIPER FOR MOTOR VEHICLES, final judgment adverse to the patentees was rendered Mar. 20, 1990, as to claims 1-3 and 5-7.

(*Official Gazette May 8, 1990*)

Adverse Decision in Interference

In Interference No. 101,835, involving Patent No. 4,630,327, M. Schmidt, H. Trube, H. Grimm, SINGLE-ARM WINDSHIELD WIPER FOR MOTOR VEHICLES, final judgment adverse to the patentee was rendered March 20, 1990, as to claims 1-3 and 5-7.
*[Official Gazette August 28, 1990]*